Patented Apr. 11, 1950

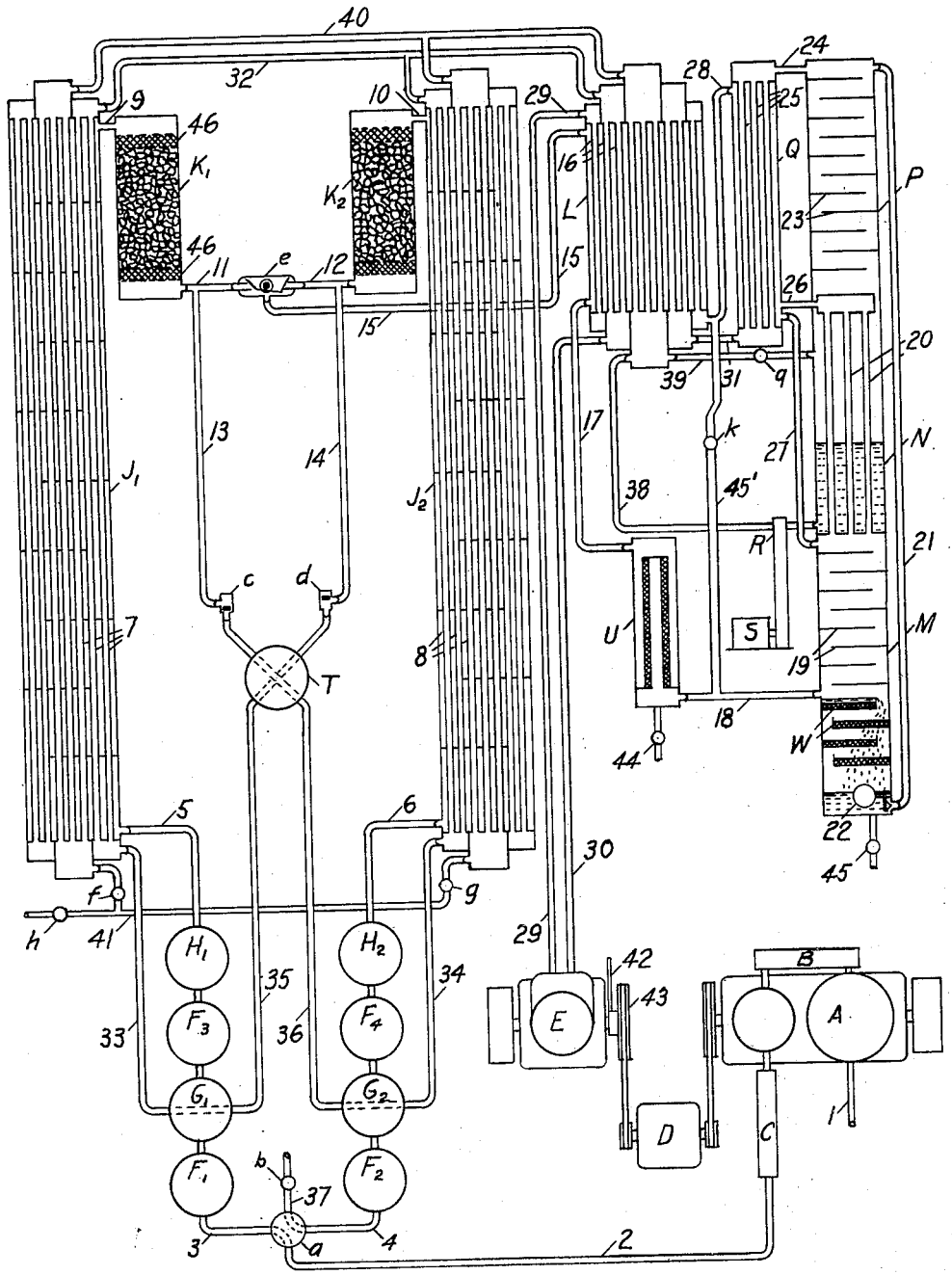

2,503,939

UNITED STATES PATENT OFFICE 2,503,939

PROCESS AND APPARATUS FOR REMOVING WATER VAPOR AND CARBON DIOXIDE FROM GASES

William Lane De Baufre, Lincoln, Nebr.

Application December 26, 1944, Serial No. 569,830

12 Claims. (Cl. 62—175.5)

This invention relates to the art of removing water vapor and carbon dioxide from atmospheric air and other gases. It is particularly applicable to plants for extracting oxygen from atmospheric air by liquefaction and rectification. In fact, it is an improvement in the "Process and apparatus for extracting oxygen from atmospheric air" described and claimed in application Serial No. 559,620, filed October 20, 1944.

The present invention can be applied to other processes and apparatus for extracting oxygen from atmospheric air and even to processes and apparatus for separating other gaseous mixtures. It is particularly adaptable for combination with the process and apparatus of the above mentioned application by reason of the low pressures involved in this process, namely, 75 to 150 lb. gage as compared with 1500 to 3000 lb. gage in other small oxygen plants or 500 lb. gage in other oxygen plants of moderate size. This is due to the fact that when a vessel filled with gas at 75 to 150 lb. gage is emptied to about atmosperic pressure, there is less loss of gas than if the pressure were 1500 to 3000 lb. gage or 500 lb. gage. There is also less danger of leakage of gas during ordinary running conditions with lower pressures.

Water vapor and carbon dioxide adversely affect the operation of air separation plants. The latent heat of condensation or sublimation requires refrigeration with higher operating pressures. Ice and solid carbon dioxide particles deposited on cooling surfaces reduce their effectiveness for heat transfer and even clog passageways for flow of fluid being cooled. Any moving parts such as valves are liable to be rendered inoperative. One object of the invention is to remove most of the water vapor and carbon dioxide from gases before they are cooled with formation of particles of ice or solid carbondioxide. Another object of the invention is to filter out solid particles from remaining water vapor and carbon dioxide before these particles adhere to cooling surfaces or moving parts.

Water vapor and carbon dioxide are removed by absorption in absorbent material or by deposition on cooling surfaces. The term absorption will be employed to cover adsorption and other phenomena of removal through contact with absorbent material. In the above mentioned application Serial No. 559,620, the carbon dioxide is removed in a scrubbing tower through which atmospheric air flows before being compressed. A solution of caustic potash or caustic soda is circulated through such scrubbing towers; and the absorption of carbon dioxide changes the caustic material to potassium carbonate or sodium carbonate so that the solution must be replaced at frequent intervals. Another object of the present invention is to eliminate this liquid absorbent that must be replaced at intervals, substituting a solid absorbent for carbon dioxide that can be re-activated in place. A further object of the invention is to provide means for the re-activation.

In application Serial No. 559,620, a solid absorbent for water vapor was proposed and means were described for its re-activation in place. A further object of the present invention is to improve the effectiveness of the solid absorbent for water vapor and the extent to which it is re-activated.

In order to re-activate absorbents for water vapor and carbon dioxide, it is necessary to install equipment in duplicate and provide valves for changing over from flow for absorption to flow for re-activation. Another object of the invention is to arrange the valves for simple operation.

Even with re-activation of absorbents for water vapor and carbon dioxide during normal operation of a plant for extracting oxygen from atmospheric air, it is necessary at long intervals to shut down the plant for defrosting, including filters for removing particles of ice and solid carbon dioxide resulting from imperfect absorption. A further object of the invention is to arrange the plant for defrosting.

Protection against particles of ice and carbon dioxide should extend to the cooling down period as well as to normal operation, and another object of the invention is to do so.

The foregoing objects together with such additional and subsidiary advantages as may hereinafter appear or are incident to the invention, are realized by the novel process and apparatus described in the specification and shown in preferred form on the drawing of the figure.

The apparatus shown in the figure comprises:

(1) Two-stage compressor A driven by motor D for compressing atmospheric air to be processed with intercooler B and aftercooler C for removing the heat of compression.

(2) Expander E for expanding the remainder of the compressed air after cooling and liquefying a portion of it.

(3) Driers $F_1$, $F_2$, $F_3$ and $F_4$ containing absorbent material for absorbing water vapor from the compressed air.

(4) Coolers $G_1$ and $G_2$ for cooling the compressed air at an intermediate stage in its drying by heat transfer to returning components separated therefrom.

(5) Heaters $H_1$ and $H_2$ for heating the returning components, preferably with steam.

(6) Interchangers $J_1$ and $J_2$ for cooling the compressed air by heat exchange with returning components separated therefrom.

(7) Decarbonators $K_1$ and $K_2$ containing absorbent material for absorbing carbon dioxide from the cooled compressed air.

(8) Heater T for heating returning components used for re-activating decarbonators $K_1$ and $K_2$ and defrosting interchangers $J_1$ and $J_2$.

(9) Liquefier L for further cooling and partly liquefying the compressed air by heat exchange with returning components separated therefrom and also for superheating the compressed air before expanding it in expander E.

(10) Rectifying column comprising preliminary rectifier M, vaporizer N and final rectifier P.

(11) Condenser Q for liquefying vapor from preliminary rectifier M in warming vapor from final rectifier P.

(12) Filter U for removing particles of ice and solid carbon dioxide from the further cooled compressed air from liquefier L.

(13) Filter W for removing particles of ice and solid carbon dioxide from liquefied air in preliminary rectifier M.

(14) Liquid oxygen pump R driven by motor S for withdrawing the oxygen in liquid form from the rectifying column.

Referring to the figure, atmospheric air from which oxygen is to be extracted, enters the plant through suction pipe 1 to two-stage compressor A. Within the two cylinders of compressor A, the atmospheric air is compressed to the pressure necessary to meet the requirements of the process, say from 5 to 12 atmospheres gage for normal operation producing gaseous oxygen at room temperature. Intercooler B and aftercooler C are provided to remove the heat of compression. The compressed air leaves through pipe 2 cooled to about atmospheric temperature.

At four-way valve $a$, the compressed air is directed into pipe 3 or pipe 4 from pipe 2. Assume that valve $a$ is turned to direct the compressed air into pipe 3 as indicated by the dotted arcs. The compressed air then flows through drier $F_1$, cooler $G_1$, drier $F_3$ and heater $H_1$ in series to pipe 5 by the absorbent material. Most of the moisture in the compressed air is absorbed in drier $F_1$ with rise in temperature due to absorption. This heat of absorption is removed in cooler $G_1$ by heat transfer to returning components separated from the air. This reduction in temperature increases the effectiveness of the second stage of absorption in drier $F_3$ wherein the absorbent material absorbs most of the remaining water vapor. Heater $H_1$ is not in operation so that the compressed air flows through pipe 5 to interchanger $J_1$ at about atmospheric temperature.

The dried compressed air is cooled as it flows back and forth across tubes 7 within interchanger $J_1$ until it leaves through pipe 9 cooled to about minus 100 centigrade. The cooled compressed air then flows through decarbonator $K_1$ where carbon dioxide is absorbed by the absorbent material therein. In the neighborhood of minus 100 centigrade is the most favorable temperature for removal of atmospheric carbon dioxide by absorption. Much above this temperature, the carbon dioxide is not removed sufficiently and much below it the absorption of oxygen and nitrogen increases rapidly with decreased capacity for carbon dioxide. The cooled compressed air leaves decarbonator $K_1$ through pipe 11 and non-return valve $e$. It cannot flow through pipe 13 against check valve $c$.

Flowing through pipe 15 to liquefier L, the cooled compressed air is further cooled and partly liquefied in the space surrounding tubes 16. The partly liquefied compressed air then flows through pipe 17, filter U and pipe 18 to preliminary rectifier M. Since the cooled compressed air is not perfectly dry and removal of carbon dioxide is not complete within decarbonator $K_1$, some particles of ice and solid carbon dioxide form within liquefier L. Filter U is provided to remove these particles from the partly liquefied air. By reducing the partial pressure of carbon dioxide vapor in decarbonator $K_1$ before the compressed air enters liquefier L, sublimation does not occur immediately to deposit solid carbon dioxide on the upper surface of tubes 16. The deposition occurs lower down where the particles are washed off by liquid air.

When the length of the rectifying column is not limited, filter W can be installed within preliminary rectifier M to remove particles of ice and carbon dioxide from the oxygen-rich liquid flowing to the bottom of the preliminary rectifier. Filter W comprises a number of trays made of porous material such as glass wool. When the liquid air drops onto the topmost tray, it flows through the glass wool and deposits particles of ice and solid carbon dioxide therein. Gradually, the interspaces fill up so that liquid air will not flow through the glass wool. The liquid air then flows over the top of the glass wool to the end of the topmost tray and carries the particles of ice and solid carbon dioxide to the next tray where they are deposited until the glass wool in the second tray also becomes clogged. Overflows are located at opposite ends of alternate trays as shown in order to cause the trays to clog in turn from one end to the other end. Thin layers of filtering material are used in order to utilize the space most effectively because the glass wool clogs along the top surface of the tray.

Where head-room is limited so that the rectifying column must be of minimum length, filter U is preferred because it can be inserted in the length of pipe from liquefier L to preliminary rectifier M. But where the rectifying column may be longer, filter W is more effective because only liquid air flows through it.

Within preliminary rectifier M, the liquefied part of the entering compressed air drops to the bottom and the vapor part rises through trays 19 to tubes 20. Within tubes 20, the rising vapor is partly liquefied to form reflux liquid which flows down through trays 19. This liquid reflux flushes any particles of ice and solid carbon dioxide out of the rising vapor and carries them to filter W. As a result of rectifying action in preliminary rectifier M, the compressed air is separated into a nitrogen-rich vapor and an oxygen-rich liquid. The oxygen-rich liquid, freed of particles of ice and solid carbon dioxide, accumulates at the bottom of preliminary rectifier M and is automatically discharged through pipe 21 by a valve controlled by float 22 which maintains a nearly constant liquid level. The pressure in preliminary rectifier M is substantially the same as the discharge pressure of compressor A, there being no throttle valve to reduce the compressed air pressure.

The oxygen-rich liquid in pipe 21 is partly vaporized by reduction in pressure from preliminary rectifier M to final rectifier P where the pressure is slightly above atmospheric pressure. The liquid part flows down through trays 23 until it reaches the space surrounding tubes 20 in vaporizer N. Here the liquid is partly vaporized by heat exchange with nitrogen-rich vapor within tubes 20 from preliminary vaporizer M. The resulting oxygen-rich vapor rises through trays 23 as reflux vapor. Rectifying action separates the entering oxygen-rich liquid into a nitrogen vapor product which leaves through pipe 24 and an oxygen liquid product which accumulates around tubes 20.

The nitrogen vapor product from final rectifier P flows through tubes 25 within condenser Q. Nitrogen-rich vapor from preliminary rectifier M enters condenser Q through pipe 26 and is partly condensed by heat exchange with the nitrogen vapor product from final rectifier P. The resulting liquid returns through pipe 27 to preliminary rectifier M where it augments the reflux liquid therein.

The remaining nitrogen-rich vapor flows through pipe 28 to liquefier L where the nitrogen-rich vapor is superheated in flowing up through tubes 16 by heat exchange with compressed air being cooled and partly liquefied around tubes 16. The superheated nitrogen-rich vapor flows through pipe 29 to expander E. Here the nitrogen-rich vapor is cooled by external work in expanding nearly to atmospheric pressure and returns through pipe 30 to liquefier L where it commingles with the nitrogen vapor product of final rectifier P returning to liquefier L through pipe 31 from condenser Q.

The commingled expanded nitrogen-rich vapor from expander E and nitrogen vapor product from final rectifier P return through tubes 16 in rectifier L in heat exchange with compressed air surrounding tubes 16. These commingled nitrogen-rich gases then return through pipe 32 to interchanger $J_1$ where these nitrogen-rich gases flow through tubes 7 and are warmed to about atmospheric temperature by heat exchange with compressed air surrounding tubes 7.

These nitrogen-rich gases at about room temperature flow through pipe 33 to cooler $G_1$ where they take up most of the heat of absorption of the compressed air from drier $F_1$. The dotted line in cooler $G_1$ indicates that the nitrogen-rich gases are kept separate from the compressed air and flow through pipe 35 to heater T where they are further warmed by condensing steam before flowing through check valve $d$ and pipe 14 to pipe 12 and decarbonator $K_2$. Here the warm dry nitrogen-rich gases re-activate the absorbent material in decarbonator $K_2$ which had previously adsorbed carbon dioxide from compressed air cooled in interchanger $J_2$ before four-way valve $a$ had changed over the flow of compressed air from interchanger $J_2$ to interchanger $J_1$.

The nitrogen-rich gases flow down through interchanger $J_2$ and pick up any frost which may have previously been deposited on the surfaces of tubes 8 due to imperfect drying of the compressed air before entering interchanger $J_2$. The nitrogen-rich gases flow through pipe 6, heater $H_2$, drier $F_4$, cooler $G_2$ and drier $F_2$ to pipe 4. Heater $H_2$ is supplied with steam to raise the temperature of the returning nitrogen-rich gases sufficiently to re-activate the absorbent material in driers $F_4$ and $F_2$. Cooler $G_2$ is not operating because no flow occurs through pipes 34 and 36 due to check valve $c$ being closed as previously mentioned. The nitrogen-rich gases finally leave the plant through pipe 37 and valve $b$. Flow from pipe 4 to pipe 37 is through four-way valve $a$ as indicated by the dotted arcs.

By turning four-way valve $a$ so that pipe 2 is connected to pipe 4 and pipe 3 is connected to pipe 37, the flows of compressed air and nitrogen-rich gases are changed over so that the compressed air flows through drier $F_2$, cooler $G_2$, drier $F_4$, heater $H_2$, interchanger $J_2$ and decarbonator $K_2$ while the nitrogen-rich gases return through tubes 8 in interchanger $J_2$, cooler $G_2$, heater T, decarbonator $K_1$, shell of interchanger $J_1$, heater $H_1$, drier $F_3$, cooler $G_1$ and drier $F_1$. Valves $c$, $d$ and $e$ automatically adjust themselves to the changed conditions of flow so that it is only necessary to turn four-way $a$ for the complete change over. Thus, when compressed air is admitted into interchanger $J_2$ and at the same time released from interchanger $J_1$, the double non-return valve $e$ automatically opens the connection between pipe 12 and pipe 15 and closes the connection between pipe 15 and pipe 11. Check valve $d$ automatically closes against flow from pipes 12 and 14. Check valve $c$ automatically opens to permit returning nitrogen-rich gases to flow from the tubes in interchanger $J_2$ through pipes 34 and 36, heater T, decarbonator $K_1$ and the shell of interchanger $J_1$.

Check valves $c$ and $d$ are standard commercial valves installed at some distance from cold pipes 11 and 12 near heater T where the temperature is always atmospheric or above. Double non-return valve $e$, however, must be installed to operate automatically where the temperature is around minus 100 centigrade. The location of decarbonators $K_1$ and $K_2$ just ahead of double non-return valve $e$ reduces the danger of this valve failing to function by reason of deposition of particles of ice or solid carbon dioxide on moving parts. The danger is reduced but not eliminated.

In order to free either valve disk in three-way valve $e$ in case of its sticking shut or open, a novel construction for a non-return valve has been devised as described and claimed in application Serial No. 569,831, filed December 26, 1944, now U. S. Patent No. 2,486,825, dated November 1, 1949.

The oxygen liquid product accumulating around tubes 20 in vaporizer N may be removed in liquid form from the rectifying columns by liquid oxygen pump R driven by motor S or the oxygen liquid may first be vaporized and then withdrawn in gaseous form through valve $q$. In the first case, liquid oxygen is returned through pipe 38 to liquefier L. In the second case, gaseous oxygen is returned through pipe 39 to liquefier L. In either case, the oxygen product is warmed in tubes 16 within liquefier L and is returned through pipe 40 to interchanger $J_1$ where the oxygen is warmed to about room temperature in flowing through tubes 7. The oxygen product returns through interchanger $J_1$ rather than interchanger $J_2$ because valve $f$ is open and valve $g$ is closed. The gaseous oxygen at about room temperature leaves through pipe 41 and valve $h$.

After a long period of operation with change over of four-way valve $a$ at frequent intervals, it is desirable to warm the whole plant to room temperature in order to defrost all parts and particularly to free filters U and W of accumulated particles of ice and solid carbon dioxide. Air for defrosting can be furnished by compressor A and this air can be dried in driers $F_1$ and $F_3$ or $F_2$ and $F_4$ and then heated by steam in heater $H_1$ or $H_2$. During the drying operation, expander E should not be running. In order to permit compressor A to be run by motor D without expander E running, clutch 42 is provided for disconnecting pulley 43 which is belted to motor D. When all parts of the plant have been warmed to somewhat above room temperature, as indicated by warm air being discharged from numerous drains such as 44 and 45 at the bottoms of filter U and preliminary rectifier M, all solids in filters U and W have been vaporized and discharged from the system. The plant is then ready to be cooled to operating temperatures again.

Clutch 42 is thrown in to engage pulley 43 so that expander E will run with motor D. Valve $k$ is open in by-pass 45' from pipe 18 to pipe 28. Motor D is then started to drive two-stage compressor A. Four-way valve $a$ may be turned as indicated in the figure. The compressed air then flows through drier $F_1$, cooler $G_1$, drier $F_2$, interchanger $J_1$, decarbonator $K_1$, liquefier L, filter U, valve $k$, pipe 28, tubes 16 and pipe 29 to expander E where all the compressed air will be expanded to about atmospheric pressure. A small portion of the compressed air will flow through the rectifying column and condenser Q to pipe 28. Most of the compressed air, however, will flow through by-pass valve $k$ by reason of lower resistance through this path.

From expander E, the expanded air reduced in temperature flows through pipe 30, tubes 16 in liquefier L, tubes 7 in interchanger $J_1$, cooler $G_1$, heater T, decarbonator $K_2$, the shell of interchanger $J_2$, heater $H_2$, drier $F_4$, cooler $G_2$ (not cooling), drier $F_2$ and valve $b$. The cooled air returning through tubes 16 in liquefier L and tubes 7 in interchanger $J_1$ will cool the compressed air before it reaches expander E. This cooling effect will be cumulative until the compressed air in liquefier L reaches the temperature of liquefaction.

When compressor A is started, the compressed air pressure will quickly build up until the density is sufficient for all the compressed air to enter expander E with its displacement volume determined by its dimensions and rotative speed. As the inlet temperature to expander E drops, the compressed air pressure will experience a corresponding drop due to increased density. When the liquefaction temperature is reached, a further drop in pressure results from the fact that only a portion of the compressed air reaches expander E.

All during the cooling down period, the compressed air will first pass through filter U at a lower temperature than it enters expander E because the compressed air will be subsequently reheated in tubes 16 of liquefier L before flowing through pipe 29 to expander E. Filter U thus protects expander E from particles of ice and solid carbon dioxide during the cooling down period.

When liquids have been sufficiently built up in the rectifying column, by-pass valve $k$ is closed for normal operation as previously described.

The above description has referred to driers F containing absorbent material for absorbing water vapor and decarbonators K containing absorbent material for absorbing carbon dioxide from compressed air. However, any absorbent material for water vapor will also absorb carbon dioxide and any absorbent material for carbon dioxide will also absorb water vapor. That is, some carbon dioxide will be removed in driers F and some water vapor will be removed in decarbonators K. The absorbent material used in driers F may be selected for its capacity to absorb water vapor, such as specially treated alumina or silica, and the absorbent material used in decarbonators K may be selected for its capacity to absorb carbon dioxide, such as activated carbon. Usually, however, the same absorbent material will be used in driers F and in decarbonators K. Driers F will remove mainly water vapor at normal atmospheric temperatures of the absorbent material and decarbonators K will remove mainly carbon dioxide in the neighborhood of minus 100 centigrade.

Either driers F or decarbonators K may be used without the other for removing both water vapor and carbon dioxide. Thus, driers F may be relied upon for removal of both water vapor and carbon dioxide, particularly with filter U or filter W in place to protect float-controlled valve 22. Or, decarbonators K may be relied upon for removal of some water vapor as well as carbon dioxide after most of the water vapor has been deposited as water or frost on the cooling surfaces of interchangers J.

Driers $F_1$, $F_2$, $F_3$ and $F_4$ and coolers $G_1$ and $G_2$ may be used with a single interchanger J. The flows of compressed air and of returning nitrogen-rich gas would be alternated through the two sets of driers with an intermediate cooler by means of four-way valve $a$ in combination with check valves $c$ and $d$, and three-way non-return valve $e$. Non-return valve $e$ would be connected between driers $F_3$ and $F_4$ and the single interchanger to prevent return flow of compressed air into either drier $F_3$ or $F_4$ from the other drier. Check valves $c$ and $d$ would be in the cross-over piping from $G_1$ to $F_4$ or $G_2$ to $F_3$ to permit flow of returning nitrogen-rich gas through the driers but check return flow of compressed air from the driers. Only one heater would then be required instead of both heaters $H_1$ and $H_2$ for warming the returning nitrogen-rich gas before it flows through the driers.

Decarbonators J are shown with a layer of filtering material 46 both above and below the absorbent material. This filtering material prevents carry over of particles of absorbent material into other parts of the apparatus during absorption and during re-activation.

In the following claims, atmospheric air is said to be separated into a liquid product and a nitrogen-rich gas for purposes of defining the invention. In the process described in the specification, the liquid product is liquid oxygen which may be removed in liquid form from the rectifying column or may first be vaporized and removed in vapor form. The liquid product, however, might be liquid air in a plant for producing liquid air instead of liquid oxygen. The process and apparatus may also be utilized for removal of water vapor and carbon dioxide from other gaseous mixtures than atmospheric air with a corresponding liquid product and a gas rich in some other constituent than nitrogen.

I claim:

1. Process for removing water vapor from a gaseous mixture to be separated into a liquid product and a gas rich in one component, which includes compressing the gaseous mixture, passing the compressed gaseous mixture through absorbent material to remove water vapor from the compressed gas which is warmed by the heat of absorption, cooling the partly dried compressed gas to remove the heat of absorption, passing the cooled and partly dried compressed gas through additional absorbent material to remove more water vapor from the compressed gas at the reduced temperature, cooling the dried compressed gas until it is partly liquefied, rectifying the partly liquefied gas to separate it into the liquid product and the gas rich in one component, utilizing the gas rich in one component to cool the dried compressed gas until it is partly liquefied, and then utilizing the gas rich in one component to cool the partly dried compressed gas to remove the heat of absorption.

2. Process for removing water vapor from a gaseous mixture to be separated into a liquid product and a gas rich in one component as in claim 1 wherein the absorbent material is reactivated by shutting off flow of the compressed gas through the absorbent material and passing therethrough the gas rich in one component, and then again passing the compressed gas through the reactivated absorbent material in order to remove water vapor from the compressed gas before cooling and rectifying it.

3. Process for removing carbon dioxide from atmospheric air to be separated into components by partial liquefaction and rectification, which includes cooling the atmospheric air until a temperature is reached in the neighborhood of one hundred degrees below zero centigrade, passing the cooled air through absorbent material to remove gaseous carbon dioxide therefrom, further cooling the air until it is partly liquefied, rectifying the partly liquefied air to separate it into components, utilizing one component to cool and partly liquefy the air whereby the said component is warmed nearly to atmospheric temperature, utilizing the warmed component to reactivate absorbent material which had previously absorbed carbon dioxide, and subsequently passing the cooled air through the reactivated absorbent material.

4. Process for removing water vapor and carbon dioxide from atmospheric air to be separated into components by partial liquefaction and rectification, which includes compressing the atmospheric air, passing the compressed air through absorbent material to remove water vapor therefrom, cooling the dried compressed air to a temperature in the neighborhood of one hundred degrees below zero centigrade, passing the cooled air through absorbent material to remove gaseous carbon dioxide therefrom, further cooling the air until it is partly liquefied, rectifying the partly liquefied air to separate it into components, utilizing one component to cool and partly liquefy the air whereby the said component is warmed nearly to atmospheric temperature, utilizing the warmed component to reactivate absorbent materials which had previously absorbed carbon dioxide and water vapor, and subsequently passing the compressed air through the reactivated absorbent materials.

5. Apparatus for separating atmospheric air into a liquid product and a nitrogen-rich gas, which includes a compressor for compressing the atmospheric air, a drier containing absorbent material for removing water vapor from the compressed air which is warmed by the heat of absorption, an exchanger for removing the heat of absorption from the partly dried compressed air, a second drier containing absorbent material for absorbing additional water vapor from the partly dried compressed air at the reduced temperature, heat exchange means for cooling and partly liquefying the dried compressed air, rectification means for separating the partly liquefied air into a liquid product and a nitrogen-rich gas, connecting piping for conveying the compressed air from the compressor to the first drier, the exchanger, the second drier, said heat exchange means and said rectification means in series, means for returning the nitrogen-rich gas through the heat exchange means wherein the nitrogen-rich gas is warmed nearly to atmospheric temperature by heat exchange with the dried compressed air to cool and partly liquefy it, and means for passing the warmed nitrogen-rich gas through the said exchanger to absorb the heat of absorption from the partly dried compressed air.

6. Apparatus for separating atmospheric air into a liquid product and a nitrogen-rich gas as in claim 5, including a duplicate pair of driers containing absorbent material, means for passing the further warmed nitrogen-rich gas through the absorbent material in the duplicate driers to remove any water vapor previously absorbed therein, and means for subsequently passing the compressed air through the said duplicate driers containing the reactivated absorbent material.

7. Apparatus for separating a gaseous mixture into a liquid product and a gas rich in one component, which includes a compressor for compressing the gaseous mixture, interchangers in duplicate for cooling the compressed gaseous mixture within a compressed gas space with cooling surfaces on which frost is deposited, means for conveying the compressed gaseous mixture from said compressor to the compressed gas space in one of said interchangers, means for further cooling and for rectifying the cooled gaseous mixture into a liquid product and a gas rich in one component, means for returning the gas rich in one component through the one of said interchangers in heat exchange with the compressed gaseous mixture whereby the gas rich in one component is warmed to about room temperature, means for passing the warmed gas rich in one component through the compressed gas space of the other of said interchangers, and means for changing the flow of compressed gaseous mixture from the one to the other of said interchangers and of returning the gas rich in one component through the other of said interchangers in heat exchange with the compressed gaseous mixture and thence through the compressed gas space of the one of said interchangers, whereby frost previously deposited is melted from the cooling surfaces in the compressed gas space of the one of said interchangers.

8. Apparatus for separating a gaseous mixture into a liquid product and a gas rich in one component, which includes a compressor for compressing the gaseous mixture, interchangers in duplicate for cooling the compressed gaseous mixture within a compressed gas space with cooling surfaces on which frost is deposited, decarbonators in duplicate containing absorbent material for removing carbon dioxide from the cooled gaseous mixture, means for conveying the compressed gaseous mixture from said compressor to the compressed gas space in one of said interchangers and thence through one of said decarbonators, means for further cooling and for rectifying the cooled and purified gaseous mixture into a liquid product and a gas rich in one component, means for returning the gas rich in one component through the one of said interchangers in heat exchange with the compressed gaseous mixture whereby the gas rich in one component is warmed to about room temperature, means for passing the warmed gas rich in one component through the absorbent material in the other of said decarbonators and thence through the compressed gas space of the other of said interchangers, and means for changing the flow of compressed gaseous mixture from the one to the other of said interchangers and thence through the other of said decarbonators and of returning the gas rich in one component through the other of said interchangers in heat exchange with the compressed gaseous mixture and thence through the one of said decarbonators and through the compressed gas space of the one of said interchangers, whereby carbon dioxide previously absorbed is removed from the absorbent material in the one of said decarbonators and frost previously deposited is melted from the cooling surfaces in the compressed gas space of the one of said interchangers.

9. Apparatus for separating atmospheric air into a liquid product and a nitrogen-rich gas, including a heat exchanger for cooling and partly liquefying the atmospheric air whereby water vapor and carbon dioxide therein are frozen into particles of ice and solid carbon dioxide which are carried along mostly in the liquid fraction, a filter and means for passing the liquid fraction therethrough whereby particles of ice and solid carbon dioxide are deposited therein, rectifying means for separating the liquid and vapor fractions of the cooled air into a nitrogen-rich gas and an oxygen-rich liquid, a compressor for compressing the atmospheric air before it is cooled, a motor for driving the compressor, an expander connected to the motor and compressor for expanding the said nitrogen-rich gas with performance of external work, means for returning the expanded nitrogen-rich gas from the expander through the heat exchanger for cooling and partly liquefying the atmospheric air, and a clutch for disengaging the expander from the motor and compressor whereby atmospheric air can be blown through the exchange and filter to remove ice and solid carbon dioxide from the filter without cooling the compressed air.

10. Apparatus for separating atmospheric air into a liquid product and a nitrogen-rich gas, which includes a compressor for compressing the atmospheric air, an interchanger for cooling the atmospheric air, a decarbonator containing absorbent material for removing carbon dioxide from the cooled atmospheric air, a liquefier for further cooling and partly liquefying the cooled and purified air, rectification means for separating the partly liquefied air into a liquid product and a nitrogen-rich gas, means for returning the nitrogen-rich gas through the liquefier and the interchanger whereby the nitrogen-rich gas is warmed nearly to atmospheric temperature, a second decarbonator containing absorbent material, means for passing the warmed nitrogen-rich gas through the absorbent material in the second decarbonator to remove any carbon dioxide previously absorbed therein, and means for subsequently passing the compressed air through the said second decarbonator containing the reactivated absorbent material.

11. Apparatus for separating atmospheric air into a liquid product and a nitrogen-rich gas, which includes a compressor for compressing the atmospheric air, a drier containing absorbent material for removing water vapor from the compressed air which is warmed by the heat of absorption, an exchanger for removing the heat of absorption from the partly dried compressed air, a second drier containing absorbent material for absorbing additional water vapor from the partly dried compressed air at the reduced temperature, an interchanger for cooling the atmospheric air, a decarbonator containing absorbent material for removing carbon dioxide from the cooled atmospheric air, a liquefier for further cooling and partly liquefying the cooled and purified air, rectification means for separating the partly liquefied air into a liquid product and a nitrogen-rich gas, connecting piping for conveying the compressed air from the compressor to the first mentioned drier, the exchanger, the second drier, said interchanger, said decarbonator, said liquefier and said rectification means in series, means for returning the nitrogen rich gas through the liquefier and the interchanger wherein the nitrogen-rich gas is warmed nearly to atmospheric temperature by heat exchange with the dried compressed air to cool and partly liquefy it, and means for passing the warmed nitrogen-rich gas through the said exchanger to absorb the heat of absorption from the partly dried compressed air.

12. Apparatus for separating atmospheric air into a liquid product and a nitrogen-rich gas as in claim 11, which includes a duplicate pair of driers containing absorbent material with intermediate duplicate exchanger, duplicate interchanger and duplicate decarbonator containing absorbent material, means for passing the warmed nitrogen-rich gas through the absorbent material in the duplicate decarbonator and thence through the duplicate interchanger and duplicate pair of driers to remove any carbon dioxide and water vapor previously absorbed therein, and means for subsequently passing the compressed air through the duplicate driers, duplicate exchanger, duplicate interchanger and duplicate decarbonator to the said liquefier.

WILLIAM LANE DE BAUFRE.

REFERENCES CITED

The following references are of record in the file of this patent:

UNITED STATES PATENTS

| Number | Name | Date |
| --- | --- | --- |
| 642,505 | Thrupp | Jan. 30, 1900 |
| 2,026,935 | Downs | Jan. 7, 1936 |
| 2,256,421 | Borchardt | Sept. 16, 1941 |
| 2,337,474 | Kornemann et al. | Dec. 21, 1943 |
| 2,340,398 | MacMullin | Feb. 1, 1944 |
| 2,374,091 | Garrison | Apr. 17, 1945 |

FOREIGN PATENTS

| Number | Country | Date |
| --- | --- | --- |
| 178,112 | Great Britain | Mar. 15, 1923 |
| 469,943 | Great Britain | Aug. 3, 1937 |